United States Patent
Drummer

Patent Number: 5,880,693
Date of Patent: Mar. 9, 1999

[54] METHOD AND APPARATUS FOR THE WIRELESS EXCHANGE OF INFORMATION BETWEEN STATIONS

[75] Inventor: Clemens Drummer, Forchheim, Germany

[73] Assignee: Diel GmbH & Co., Germany

[21] Appl. No.: 746,006

[22] Filed: Nov. 5, 1996

[30] Foreign Application Priority Data

Nov. 21, 1995 [DE] Germany .......................... 195 43 321.1

[51] Int. Cl.⁶ ............................................. G01S 5/02
[52] U.S. Cl. ........................ 342/357; 342/354; 342/359
[58] Field of Search .................................. 342/357, 354, 342/359, 372, 352

[56] References Cited

U.S. PATENT DOCUMENTS

| | | | |
|---|---|---|---|
| 4,232,313 | 11/1980 | Fleishman ................................. | 343/6 R |
| 4,622,557 | 11/1986 | Westerfield ............................... | 342/357 |
| 5,046,006 | 9/1991 | Revord et al. ........................... | 364/423 |
| 5,340,056 | 8/1994 | Guelman et al. ........................ | 244/3.16 |
| 5,594,454 | 1/1997 | Devereux et al. ....................... | 342/357 |
| 5,644,318 | 7/1997 | Janky et al. .............................. | 342/357 |

FOREIGN PATENT DOCUMENTS

| | | |
|---|---|---|
| 29 10 956 C2 | 6/1981 | Germany . |
| 3313648 A1 | 10/1984 | Germany . |
| 3720173 A1 | 1/1989 | Germany . |
| 2144008 | 2/1985 | United Kingdom . |

OTHER PUBLICATIONS

Wehrtechnik (1995), Issue 9, p. 48 (bottom left).

*Primary Examiner*—Thomas Tarcza
*Assistant Examiner*—Dao L. Phan
*Attorney, Agent, or Firm*—Scully, Scott, Murphy and Presser

[57] ABSTRACT

For power-optimised radio relay communication between in particular a station (11) which is operating at low level and navigating at high speed and which is fixed to a missile and a remote ground station (12) the apparatus and time expenditure for antenna tracking from the missile station (11) to the relay station (13) is reduced by the conventional production of an item of tracking direction information (17) on board the missile by direction-finding being replaced by computation of the directional information (17) from a comparison of the current locational data (15, 15') of the navigating station (11) and the relay station (13). If the position of the relay station (13) is variable its locational information (15') is also up-dated with satellite support, for example for correction of a reference position stored there it is transmitted to the missile station (11). In the interests of even more precise orientation of the electronically pivotable array antenna (21) satellite navigational errors can be ascertained from the stationary ground station (12) and transmitted to the cooperative stations (13–11) thereof for additionally taking same into account when computing the directional information (17) for antenna orientation.

8 Claims, 2 Drawing Sheets

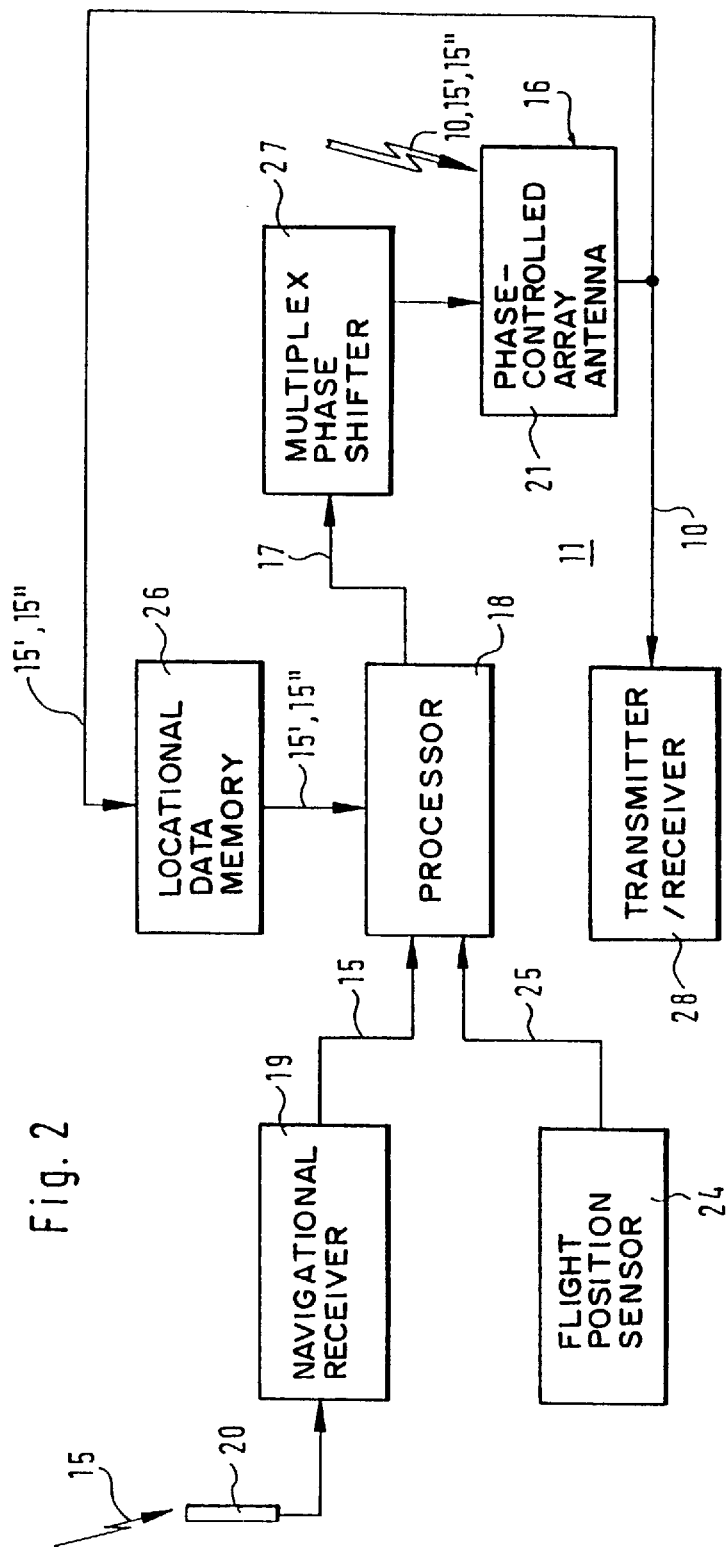

METHOD AND APPARATUS FOR THE WIRELESS EXCHANGE OF INFORMATION BETWEEN STATIONS

BACKGROUND OF THE INVENTION

1. Field of the Invention

The present invention relates to a method and to an apparatus for the wireless exchange of items of information between a first station which, in particular is fixed to a missile, and a second station, particularly a stationary station, through the intermediary of a relay station by way of a directionally-optimizable antenna.

2. Discussion of the Prior Art

Such arrangements are known from DE 33 13 648 A1, in such a form that a submunition is moved by means of a carrier into a position over a piece of territory to be reconnoitred and after release from the carrier still uses same as a relay station for the transmission of information to a remote ground station. As the period of time between the missile station (submunition) being released and the relay station (carrier) crashing, due to the system conditions involved, is very short, there are also no long radio distances that have to be bridged across between those two stations. For that reason that publication does not mention any considerations relating to optimisation, in terms of power, of the radio communication or traffic during that short operating period.

For reliable transmission of information, DE 29 10 956 C2 proposes not using a satellite or an aircraft for the relay function, but storing the information to be communicated in a further missile which transmits it towards the ground station again only after launch of the reconnaissance aircraft.

It is generally known from the art of wireless signal transmission that under comparable circumstances the transmission energy requirement is reduced if the radiation characteristic (the so-called lobe) of the transmission antenna is directed with good focussing effect onto the receiving antenna. For suitable antenna tracking between moving systems, it is known at the receiver end to provide for direction-finding in relation to the origin of the received high-frequency energy. For that purpose however the transmitter of the other station must be operating. The expenditure in terms of circuitry and in particular in terms of signal processing circuitry, for direction-finding, with a control parameter which is to be derived therefrom for pivotal movement of the receiving antenna, is very high in comparative terms, in spite of a restricted dynamic, even if the system does not involve mechanical pivotal movement of the antenna but the directional characteristic thereof is electronically pivoted by way of phase-controlled antenna elements (see DE 37 20 173 A1 or GB 2 144 008 A). Therefore tracking of the main antenna lobe, which is derived from such direction-finding, is a failure when dealing with stations which are manoeuvring at very high speed such as for example transmitting or receiving devices on board an aircraft operating at a low height above the ground.

In consideration of those factors the present invention is based on the technical problem of so developing the method and apparatus of the general kind set forth that even a station operating with fast changes in location, in the interests of advantageous radio transmission conditions, operates with antenna tracking which is always at its optimum.

SUMMARY OF THE INVENTION

In accordance with the invention that object is essentially attained in that there is effected an antenna orientation between the first and the relay stations in accordance with an item of directional information which is computed from a comparison between the instantaneous locational data of the first station and the known current locational data of the relay station.

The way in which the object of the invention is attained is accordingly based on the fundamental consideration of eliminating the circuitry and in particular dynamic problems of direction-finding for antenna tracking, by using a relay station with a location which is known on board the projectile. If then the particular location (for example by way of satellite navigation) and the particular orientation in space are also currently known, it is possible directly, without direction-finding requirements, to compute an item of directional information relating to the relay station (for example related to a coordinate system which is fixed with respect to the missile) and to direct the missile antenna in accordance with that computation result, preferably by means of phase actuation of a multi-array antenna. The antenna orientation which is derived from two relative positions is therefore ready for operation even if the counterpart station is not in a transmission mode and therefore could not be located by a direction-finding procedure.

If the relay station is geostationary, for example in the form of a very high transmitting tower or in the form of an artificial satellite which rotates in fixed relationship with the earth, then the locational information thereof can be fixedly stored on board the projectile. If however the constancy of the locational coordinates of the relay station is not reliable, for example due to orbit defects in respect of a satellite which in itself is geostationary, it is then desirable for the relay station to ascertain any current deviation from its reference position from the same satellite navigation system to which the projectile has recourse for its own locational determination procedure. Then an item of locational information, desirably in the form of an item of correction information for the stored locational information, can be transmitted from the relay station to the missile station, whereby the directional computation is accelerated and in particular antenna orientation is further improved. That variant is a particularly attractive proposition if at least one satellite with a low orbit (a so-called LEO) serves as the relay station. The location thereof can also be ascertained by the ground station and transmitted from time to time for up-dating the position memory on board the missile.

A further increase in the degree of accuracy is achieved if the ground station (with which the missile station communicates by way of the relay station) from time to time also effects its own locational determination procedure, reverting to the global system of navigational satellites (GPS or GLONASS). As the particular stationary locational coordinates are sufficiently reliably known, that locational determination procedure gives an error which is currently involved in satellite navigation and which, for making directional determination more precise, can be transmitted from the missile to the relay station and further by way of the latter to the missile station, as current satellite correction information.

BRIEF DESCRIPTION OF THE DRAWINGS

Additional alternatives and developments as well as further features and advantages of the invention will be apparent from the following description of a preferred embodiment of the present invention which is shown in the drawing in highly diagrammatic form and not to scale, being restricted to what is essential.

In the drawing:

FIG. 2 shows signal processing for optimum antenna orientation on board a missile.

DETAILED DESCRIPTION OF A PREFERRED EMBODIMENT

Figure 1:
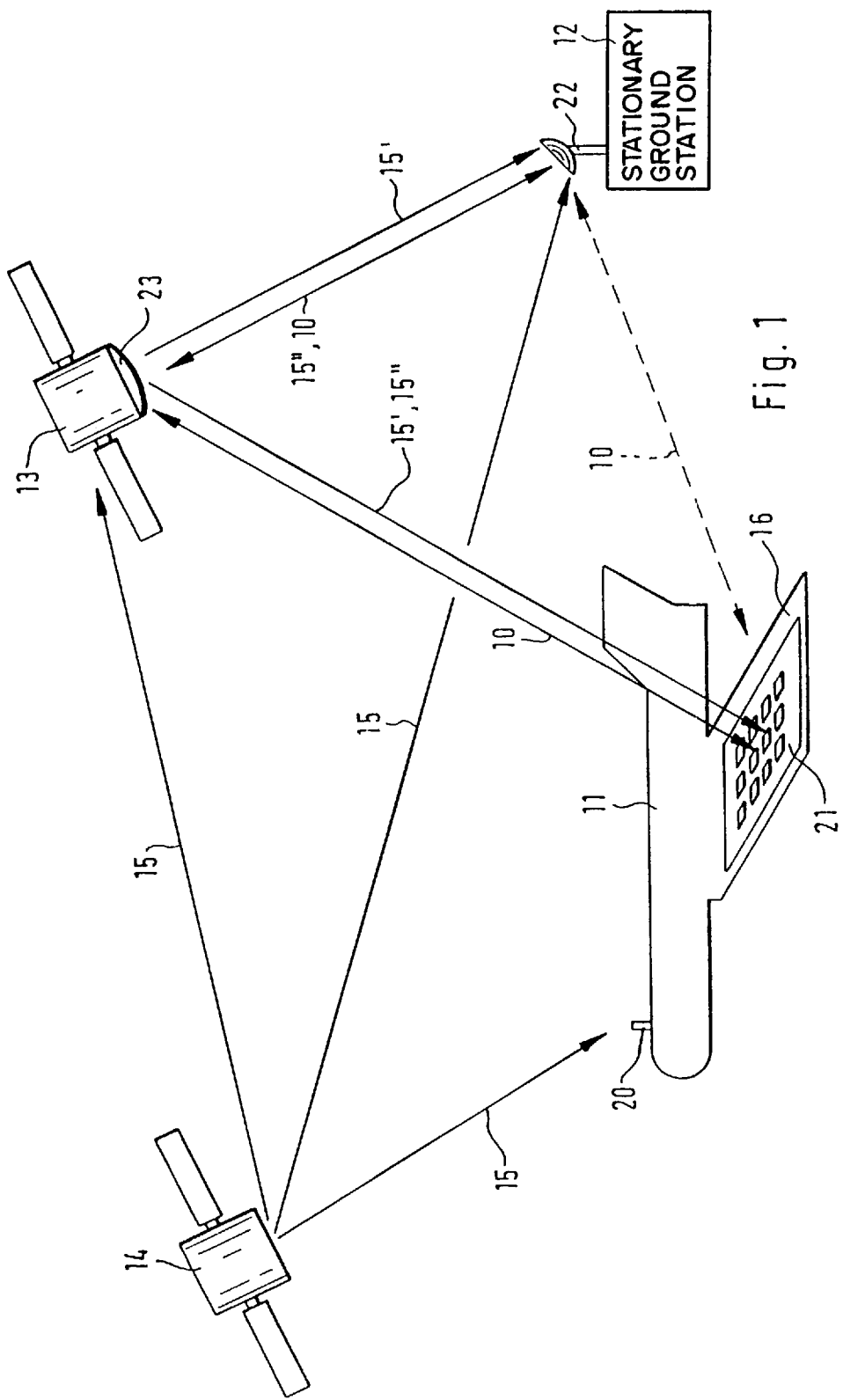
FIG. 1 shows a scenario for the transmission of information by way of a relay station.

The scenario shown in FIG. 1 involves exchanging at least one item of information 10 between a first station 11 and a second station 12. If, for reasons of practicability, the antennae 21 and 22 respectively thereof cannot project to a relatively great height above the ground, there is then no guarantee of a reliable radio communication for the exchange of the items of information 10 by means of a carrier which is typically above the very high frequencies, because of the shadowing effects caused by ground irregularities and vegetation. That applies in particular if at least one of the stations (here 11) is operating movably at a low level and the other station (12) is installed geostationarily far away therefrom. Such a configuration occurs for example when the first station 11 is a missile operating at low level (such as for example a reconnaissance drone or a combat helicopter) which is to be in radio communication with a remote ground station 12 as continuously and reliably as possible for the transmission of reconnaissance data or for receiving orders relating to action.

Therefore the communication between the stations 11–12 is by way of a third or relay station 13 which is positioned high thereabove. The relay station 13 receives the item of information 10 from the one station (11 or 12 respectively) and emits it again so that it can be received by the other station (12 or 11 respectively) approximately vertically and therefore practically undisturbed, and subjected to further processing.

In order for that purpose to manage with the minimum possible levels of transmission power, the directional characteristics of the antennae 21–22–23 are directed towards each other as well as possible. That does not involve any problems if their earth-related coordinates are known. Otherwise, the direction between the pair of transmission and receiving antennae would have to be ascertained using the methods of radio direction-finding from a received item of information 10 while the counterpart station is transmitting in order accordingly to be able to adjust the current antenna orientations. That however would be highly time-consuming in particular if at least one of the stations 11, 12, 13 (as in the case of FIG. 1, the missile station 11) is a station which is moving rapidly relative to at least one of the others. For then correction requirements in respect of antenna tracking would arise more quickly than the corresponding direction-finding information can be ascertained on board from the received item of information 10. In addition, the additional expenditure in regard to circuitry for the direction-finding procedure is really considerable, which has a disadvantageous effect in particular in terms of the apparatus design of a non-stationary station 11.

In accordance with the present invention therefore antenna tracking in relation to the relay station 13 is effected not by way of a direction-finding procedure but by taking account of the items of locational information for on the one hand the relay station 13 and on the other hand the transmitting or receiving stations 11–12—in that respect in particular for the highly mobile missile station 11 in the scenario shown in FIG. 1. For, just like the position of a ground station 12, the position of a satellite relay station 13 is relatively accurately known, even if it is not geostationary but changes in accordance with a known orbit curve as for example in the case of the LEOs. If in addition on board the missile station 11 the position thereof is continuously ascertained (or fed-back between support locations), then for optimum orientation of the antenna 21 thereof it is sufficient for the quasi-stationary absolute position data of the missile station 11 and the relay station 13 relative to each other to be evaluated. That is substantially more economical in regard to apparatus and in particular can also be effected substantially more quickly than conventional radio direction-finding for ascertaining the relative instantaneous direction relative to the counterpart radio station.

Navigational errors which with the passage of time would result in misdirection of the antenna 21 can be eliminated if at least from time to time the particular position which is ascertained on board the missile station 11 is up-dated by way of making contact with a location satellite system 14. As is known, the current specific location can be ascertained in that way with a high level of precision and then the precise direction from that station 11 to the location of the relay station 13 can be ascertained therefrom.

In the same way the relay station 13 can obtain locational data 15 about its own instantaneous location from the location satellite system 14 and emit such data as locational data 15' for fine orientation of antennae 21, 22. That is required in particular if the relay function is not effected in an at least quasi-stationary mode but for example by means of a small aircraft (see the relay drone in WEHRTECHNIK 1995, issue 9, page 48, bottom left).

Even if the positional data of the stationary station 12 are known, it may be desirable here also for locational data 15 to be received from the location satellite system 14. If such data deviate from the assured particular positional data, a correction value 15" is obtained thereby, which is available by way of the bidirectional radio paths to the relay station 13 and from same further to the missile station 11 for even more precise directional control of the antenna 21 on board the missile station 11.

In order to avoid the stability problems of a mechanically pivotable antenna 21 and the amount of space required for the pivoting mechanisms thereof, provided on board the missile station 11 is a phased-array antenna structure, in the case of a carrier aircraft such as a reconnaissance drone as the missile station 11 mounted for example on the surface of at least one of its wings 16 (FIG. 1). The current directional information 17 relating to the relay station 13 is ascertained on board the missile station 11 in a processor 18. For that purpose fed into the latter are the instantaneous particular locational data 15 which are ascertained by a navigational receiver 19 with satellite antenna 20 on board the missile station 11. In addition the flight position sensor means 24 which is present in any case for missile control supplies a current item of information 25 in respect of orientation in space (FIG. 2). The geostationary position of the relay station 13, which is known in principle, is carried in a memory 26. The locational data 15 stored therein can be checked as described above on board the relay station 13 by means of the location satellite system 14 in order to make available to the processor 18 if necessary corrected locational data 15' and possibly also a current correction value 15" from the ground station 12.

The current directional information 17 from the missile station 11 to the relay station 13, which information is obtained in that way from the particular instantaneous position, the particular instantaneous location in space and the known location of the relay station 13, controls a multiplex phase shifter 27 for time-displaced excitation of the array elements, that is to say the electronically pivotable missile antenna 21. The main direction of sensitivity thereof is thus always exactly electronically directed to the instantaneous relative location of the relay station 13. There are therefore optimum radio transmission conditions for the items of information 10 which are transmitted thereto or received therefrom, that is to say in particular for continuous operation of a low-power transmitter or receiver 28 on board the missile station 11.

Thus the orientation of the missile antenna 21 can always remain directed directly to the relay station 13, even in the event of very fast flight manoeuvres, because the arrangement does not involve time-consuming radio direction-finding, but the current positional data in respect of the intercommunicating stations 11–13 are directly compared for actuation of the array antenna 21.

In order to minimise the equipment on the missile, in accordance with the present invention, as a departure from the above-described embodiment, it can also be provided that computation of the directional information 17 is effected externally (in the relay or in the ground station 13, 12) and is transmitted by radio to the antenna phase shifter 27. Even if the pivotable antenna 21 is moved from the missile into the relay station 13, it is however then no longer possible to compensate for a disadvantageous spatial instantaneous position in respect of the rigidly oriented antenna which remains there.

I claim:

1. A method of wireless exchange of items of information between a first station which is fixed to a missile and a second stationary station via a relay station and by a directional antenna, characterized in that, the first station obtains its own current locational data from a satellite navigational system, the directional antenna orientation between the first station and the relay station is determined by directional information which is computed by comparing instantaneous locational data of the first station with known current locational data of the relay station, and the main lobe of a directional phase-controlled array antenna is pivoted in accordance with the directional information.

2. A method according to claim 1, characterized in that the relay station obtains or corrects its current locational data from a satellite navigational system and transmits it to the first station.

3. A method according to claim 2, characterized in that the second station is a ground station which checks its stationary locational coordinates relative to a satellite navigational system and transmits any deviation as a correction value via the relay station to the first station.

4. A method according to claim 1, characterized in that the second station is a ground station which checks its stationary locational coordinates relative to a satellite navigational system and transmits any deviation as a correction value via the relay station to the first station.

5. Apparatus for a wireless exchange of items of information (10) between a first station (11) which is fixed to a missile and a second stationary ground station (12) via a relay station (13) and by a directional antenna (21) characterized in that, the ground station (12) transmits satellite-supported locational data (15') to the relay station (13) and the first station (11), and on board the first station (11) for orientation of its antenna (21), an item of current directional information (17) relating to the relay station (13) is derived by a processor (18) from locational data (15') available with respect to the relay station (13) compared with currently navigationally ascertained locational data (15) of the first station and items of position-orientation information (25) ascertained by sensor means, the processor (18) receives satellite-supported locational data (15') from the relay station (13), and the processor (18) outputs directional information (17) to a phase shifter (27) for phase-displaced actuation of the elements of an array directional antenna (21).

6. Apparatus according to claim 5, characterized in that the processor (18) is connected downstream of a memory (26) for the relay locational data (15'), a satellite navigation receiver (19) for the locational data (15) of the station and a station flight position sensor means (24) for the items of orientation information (25).

7. Apparatus according to claim 6, characterized in that the first station (11) is disposed in a projectile operated near the surface of the earth, and the relay station (13) comprises a substantially geostationary satellite.

8. Apparatus according to claim 5, characterized in that the first station (11) is disposed in a projectile operated near the surface of the earth, and the relay station (13) comprises a substantially geostationary satellite.

* * * * *

UNITED STATES PATENT AND TRADEMARK OFFICE
CERTIFICATE OF CORRECTION

PATENT NO. : 5,880,693
DATED : March 9, 1999
INVENTOR(S) : Clemens Drummer

It is certified that error appears in the above-identified patent and that said Letters Patent is hereby corrected as shown below:

<u>Title page,</u>
Item [73], "Diel" should read -- Diehl --

Signed and Sealed this

Twenty-fifth Day of December, 2001

Attest:

Attesting Officer

JAMES E. ROGAN
Director of the United States Patent and Trademark Office